Patented July 26, 1927.

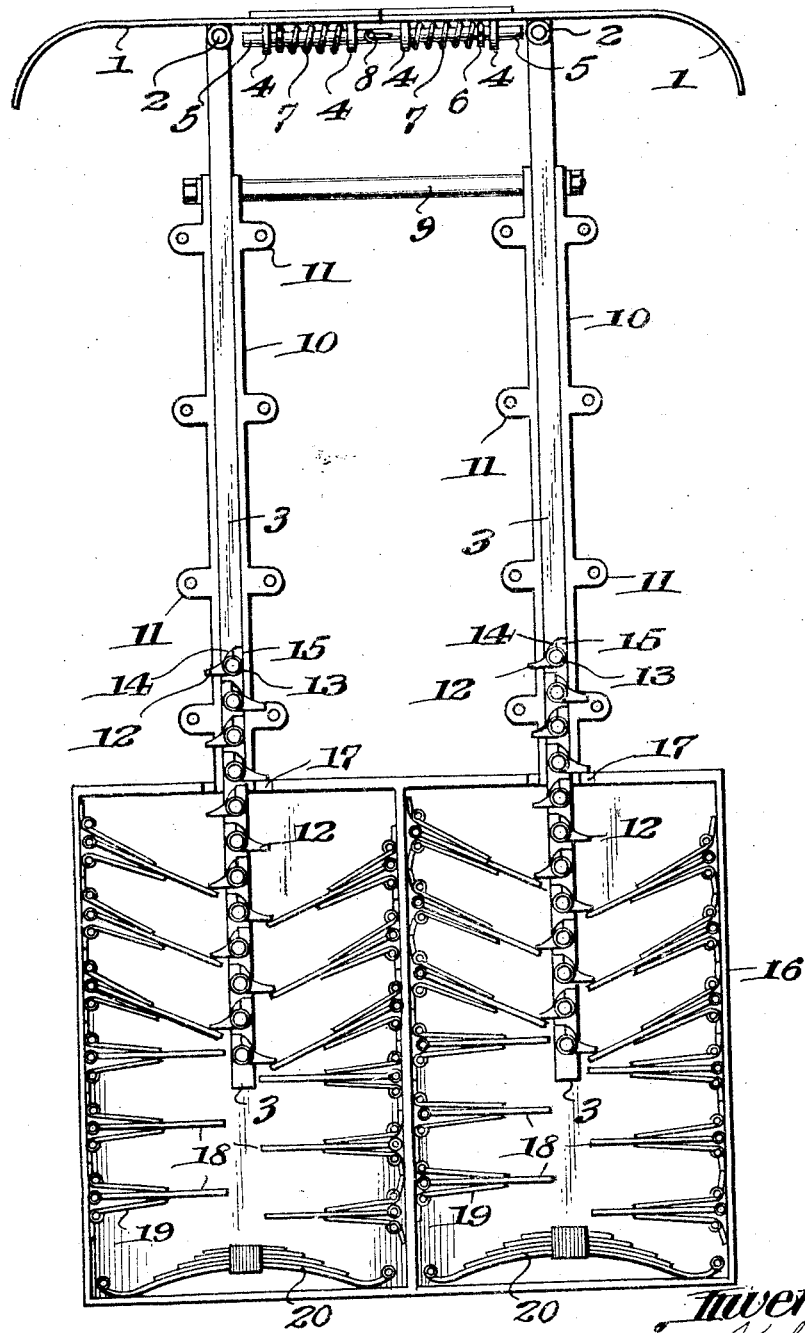

1,637,152

UNITED STATES PATENT OFFICE.

JOHN ADAM KEHRER, OF ROCKPORT, INDIANA.

AUTOMOBILE BUMPER.

Application filed December 14, 1926. Serial No. 154,876.

This invention relates to bumpers intended for use on automobiles and trucks and it has for its object the provision of improvements whereby increasing resistance will be offered to the bodily movement or flexing of the bumper when an object is struck.

My bumper differs from those of which I have knowledge in that means are provided for offering an increased resilient resistance proportioned to the blow or pressure exerted on the bumper when it strikes an object or another automobile, the purpose being to gradually take up or compensate for the force of the blow and thus minimize the shock to which the automobile or truck carrying the bumper is subjected, as also, to gradually decrease the blow delivered to the object or car struck.

In carrying out the invention there is provided a bumper having a striking or contact part of any desired construction but, preferably, comprising pivotally mounted sections having a cushioning spring connection between them so that either, or both may yield, according to the part of the bumper which receives the blow, and a novel construction and arrangement of slidable bars, pivoted dogs, and spring cushioned abutments with which the dogs are adapted to co-operate, the dogs and abutments being arranged so that the spring cushioned abutments will be successively engaged by the dogs to increase the resistance in a step-by-step fashion according to the force of the blow.

In its broadest aspect, my invention is not limited to specific means for accomplishing this purpose as other means may be used in lieu thereof which will function in the same fashion.

The invention also contemplates the provision of means for returning the sliding bars of the bumper to normal position.

The accompanying drawing is a plan view, certain cover plates being omitted, the bumper bars being shown pushed in, illustrating the action of the device when the bumper comes into contact with an object.

The bumper 1 may be of any desired construction but preferably is composed of separate sections independently pivoted at 2 to the slidably mounted bumper bars 3 and said bumper sections are yieldably connected, preferably by a suitable spring cushion. As shown, the bumper sections have guides 4 in which are slidably mounted the rods 5 which carry collars 6. Springs 7 are interposed between the collars 6 and one of the guides 4 so that the springs tend to force the rods 5 in opposite directions, thereby to keep the bumper sections 1 arranged as shown in the drawings. The rods 5 have any suitable pivoted or linked, lost-motion connection 8 such, for instance, as a pin and slot connection.

Suitably connected together as, for instance, by a bar 9 are tubular guides 10 which have ears 11 by which they may be secured to the frame of the automobile underneath the latter to mount the bumper on the automobile or truck.

Slidably mounted in these guides 10 are the bumper bars 3 which carry the bumper 1. These bars 3 are provided with series of dogs 12 which are independently or individually pivoted at 13 and have a lug or stop 14 adapted to engage a lug or stop 15 on the bar 3 to limit the movement of the dog in one direction, without interfering with its pivotal action in the opposite direction.

Preferably, the rods are arranged so that they project in opposite directions, alternately, considered in the direction of the length of the bars 3.

The invention is not limited to any number of the dogs 12 nor to the described means for arresting them.

The dogs 12 project through slots in the sides of the guides 10.

The spring cushioning devices for taking up the force of the impact or blow received by the bumper 1 are contained within a box, shell or casing 16 which is connected to the frame of the automobile or truck in any desired manner.

The guides 10 are suitably secured to the box or shell 16 and openings 17 are provided through which the bars 3 may enter the interior of the shell or casing 16 when the bumper 1 comes in contact with any object.

Arranged in series within the box or shell 16 are wings or plates 18, of which there may be as many as desired. These wings or plates normally stand in right angular relationship to the bars 3, they being held in that position by any suitable springs as, for instance, springs 19 bearing against the opposite sides of the wings or plates 18. Preferably, the wings or plates 18 of one series are arranged in staggered relationship to those of the other series so that adjacent dogs 12 will simultaneously strike wings or plates 18 of the respective series.

At the end of the shell or casing 16 are return springs 20 which, when struck by the bars 3, cause the bars to be forced outwardly when the bumper 1 is freed from the object with which it has come in contact. These springs 20 are employed to assist the springs 19 and to effect a quick return of the bars 3 but, it will be understood, that the springs 19 themselves will return the bars 3 to normal position when the bumper is freed, because those of the springs 19 which have been placed under compression as the bars 3 are forced into the box 16, will tend to resume their normal positions when the bumper 1 is freed thereby pressing against the dogs 12 and causing the stops or shoulders 14, 15, to engage, hence forcing the bars 3 outwardly.

When the bumper 1 comes in contact with any object, the bars 3 are forced inwardly, whereupon the dogs 12 successively contact with the spring actuated wings or plates 18 to an extent corresponding to the force of the blow delivered to the bumper. The bars 3 will be forced inwardly to a greater or lesser distance because the successive dogs encounter additional resistance, resiliently applied, the farther they are forced into the box or shell 16 until, finally, if the impact on the bumper is sufficient, the ends of the bars strike the return springs 20 which have a very strong cushioning action and also assist in returning the bars 3 when the pressure is released from the bumper 1.

My invention enables an increasing resilient resistance or cushioning action to be applied to the bumper bars with the result that when an object is struck and the impact is such that it exceeds the elastic limits of the bumper sections 1, the entire bumper construction yields to a degree sufficient to compensate for the force of the blow, whether it be light or heavy.

What I claim is:

1. A slidably mounted bumper for automobiles, provided with spring actuated wings or plates arranged to progressively resist the movement of the bumper to compensate for the blow or impact.

2. A slidably mounted bumper for automobiles, provided with spring actuated wings or plates arranged to progressively resist the movement of the bumper to compensate for the blow or impact, said slidably mounted bumper being provided with movable dogs adapted to co-operate with the wings or plates for the aforesaid purpose and arranged so that, when the impact or pressure on the bumper is released, the dogs will act as stops or abutments to enable the wings or plates to return the bumper to normal position.

3. A slidably mounted bumper for automobiles, provided with a series of stops, in combination with cushioning means for engaging said stops when the bumper receives a blow, thereby to cushion the bumper in a progressive manner.

4. A slidably mounted bumper for automobiles, provided with a series of pivotally mounted dogs movable in one direction but arrested against movement in the opposite direction, in combination with cushioning means for engaging said pivotally mounted dogs when the bumper receives a blow, thereby to cushion the bumper in a progressive manner.

In testimony whereof I affix my signature.

JOHN ADAM KEHRER.